United States Patent
Eatedali et al.

(10) Patent No.: US 10,596,471 B2
(45) Date of Patent: Mar. 24, 2020

(54) SYSTEMS AND METHODS FOR ENABLING AUDIENCE PARTICIPATION IN MULTI-PLAYER VIDEO GAME PLAY SESSIONS

(71) Applicant: Activision Publishing, Inc., Santa Monica, CA (US)

(72) Inventors: Josiah Eatedali, Los Angeles, CA (US); Jon Estanislao, South Pasadena, CA (US); Etienne Pouliot, Quebec City (CA); Dave Bergeron, Quebec City (CA); Maxime Babin, Quebec City (CA); Mario Beckman Notaro, Quebec City (CA)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/054,507

(22) Filed: Aug. 3, 2018

(65) Prior Publication Data
US 2019/0192974 A1 Jun. 27, 2019

Related U.S. Application Data

(60) Provisional application No. 62/609,374, filed on Dec. 22, 2017.

(51) Int. Cl.
A63F 13/86 (2014.01)
A63F 13/69 (2014.01)
A63F 13/792 (2014.01)
A63F 13/65 (2014.01)
(Continued)

(52) U.S. Cl.
CPC ............. A63F 13/86 (2014.09); A63F 13/65 (2014.09); A63F 13/69 (2014.09); A63F 13/792 (2014.09); A63F 13/85 (2014.09); A63F 13/87 (2014.09); A63F 2300/577 (2013.01)

(58) Field of Classification Search
None
See application file for complete search history.

(56) References Cited

U.S. PATENT DOCUMENTS 5,530,796 A  6/1996  Wang
5,561,736 A  10/1996 Moore
5,563,946 A  10/1996 Cooper
(Continued)

FOREIGN PATENT DOCUMENTS

AU        768367      3/2004
AU      2005215048   10/2011
(Continued)

Primary Examiner — Jason T Yen
(74) Attorney, Agent, or Firm — Novel IP

(57) ABSTRACT

The present specification describes systems and methods that enable non-players to participate as spectators in online video games and, through a collective voting mechanism, determine the occurrence of certain events or contents of the gameplay in real time. Game event options are generated and presented to non-players. A specific one of the game event options is then selected based on a collective vote of the non-players. Once selected, the specific one or more of the game event options are then generated as actual gaming events and incorporated into a video game stream that is transmitted to the players as part of the gameplay session. In this manner, non-players may be able to directly affect the course of gameplay.

25 Claims, 6 Drawing Sheets

(51) Int. Cl.
*A63F 13/85* (2014.01)
*A63F 13/87* (2014.01)

(56) References Cited

U.S. PATENT DOCUMENTS

| | | |
|---|---|---|
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |

(56) References Cited

U.S. PATENT DOCUMENTS

| | | |
|---|---|---|
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2003/0158827 A1 | 8/2003 | Ansari |
| 2004/0224741 A1 | 11/2004 | Jen |
| 2005/0113164 A1 | 5/2005 | Buecheler |
| 2005/0161878 A1 | 7/2005 | Nally |
| 2005/0192097 A1 | 9/2005 | Farnham |
| 2006/0098013 A1* | 5/2006 | Wong .................. A63F 13/12 345/473 |
| 2007/0060337 A1* | 3/2007 | Abe .................. A63F 13/10 463/30 |
| 2007/0087835 A1 | 4/2007 | Van Luchene |
| 2007/0173323 A1 | 7/2007 | Johnson |
| 2007/0281285 A1 | 12/2007 | Jayaweera |
| 2008/0268943 A1 | 10/2008 | Jacob |
| 2009/0075738 A1 | 3/2009 | Pearce |
| 2009/0113448 A1 | 4/2009 | Smith |
| 2010/0304839 A1 | 12/2010 | Johnson |
| 2012/0010734 A1 | 1/2012 | Youm |
| 2012/0094762 A1 | 4/2012 | Khan |
| 2012/0122552 A1 | 5/2012 | Youm |
| 2012/0142429 A1 | 6/2012 | Muller |
| 2012/0282995 A1 | 11/2012 | Allen |
| 2013/0252737 A1 | 9/2013 | Mescon |
| 2014/0004960 A1 | 1/2014 | Soti |
| 2014/0011595 A1 | 1/2014 | Muller |
| 2014/0344725 A1 | 11/2014 | Bates |
| 2015/0231502 A1 | 8/2015 | Allen |
| 2015/0273340 A1 | 10/2015 | Cudak |
| 2016/0001181 A1 | 1/2016 | Marr |
| 2016/0001184 A1 | 1/2016 | Sepulveda |
| 2016/0005270 A1 | 1/2016 | Marr |
| 2016/0067611 A1 | 3/2016 | Ware |
| 2016/0067612 A1 | 3/2016 | Ntoulas |
| 2016/0191671 A1 | 6/2016 | Dawson |
| 2016/0346694 A1* | 12/2016 | Fisher .................. A63F 13/58 |

(56) References Cited

U.S. PATENT DOCUMENTS

| | | | |
|---|---|---|---|
| 2017/0001111 A1* | 1/2017 | Willette | A63F 13/85 |
| 2017/0252654 A1 | 9/2017 | Hong | |
| 2018/0169515 A1 | 6/2018 | Rice | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020871 56 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

SYSTEMS AND METHODS FOR ENABLING AUDIENCE PARTICIPATION IN MULTI-PLAYER VIDEO GAME PLAY SESSIONS

CROSS-REFERENCE

The present application relies on U.S. Patent Provisional Application No. 62/609,374, entitled "Systems and Methods for Enabling Audience Participation in Multi-Player Video Game Play Sessions" and filed on Dec. 22, 2017, for priority. The aforementioned application is incorporated herein by reference in its entirety.

FIELD

The present specification is related generally to the field of gaming, animation and computer graphics. More specifically the present specification is related to a system and method for enabling non-player third parties, such as audience members, to participate in a multi-player video game play session by influencing or effecting game events.

BACKGROUND

The proliferation of reliable and affordable broadband services allows for a greater number of people to enjoy computer or video games of various genres. For example in some computer games, players conquer territories of complete other missions for ever-increasing rewards. In many role-playing games (RPG) or first-person shooter (FPS) games, each player controls the actions of at least one character. In addition, players develop unique characters and by controlling the actions of the characters they create during gameplay, the players (via their characters) accumulate various objects and abilities through extended play. The rules for how quickly, how many and what type of abilities and objects a character may earn or gain usually involves several ratings or statistics. These ratings determine the outcome of various chance or future events that lead to new objects and abilities.

Along with the popularity of online gaming, demand for live streaming or pre-stored replays of video gameplay sessions has grown. Furthermore, many gamers are increasingly sharing their gameplay through social networks. In many game titles or genres, a video game player may compete against another player either in person or via an online platform. Many online games offer leaderboards which allow a player to judge how a particular game play session compared against other game players. Most leaderboards measure a level achieved and certain standard statistics, such as the amount of time played to achieve the level. Simple performance metrics are often used to display basic statistics on performance. Examples of such metrics include the number of kills, kill/death ratio, scores, achievements, timings, and levels passed. This data is sent by the game client running on the player's home console or personal computer (PC) to the leaderboards service hosted at the back end of the gaming system.

From a player's perspective, certain games may have an endpoint or hit a plateau where the player's enjoyment stagnates because the player has achieved the biggest challenge possible or has used all of the assets available to him or her in achieving an objective. Users may then want to try other games in the same genre, but they also have a tendency to be discouraged if they do not win or acquire any assets in a few consecutive games, if they are not able to play at a level they are accustomed to, if they perceive a game level to be too complex, or if the game rewards are not forthcoming.

Further, several players of a video game are not always engaged with the video game. Some players may play the game intermittently. Other players may visit the game website or use the game app only in rare instances. Especially in the smart device market segment, users are very time sensitive and tend to skip or switch to another game, application, channel or device webpage, whenever they do not feel engaged with a game.

Unlike real live action sports, where even an audience feels very involved in a game, spectators of online virtual games may not feel as engaged with the game. Conventional gaming systems are limited in the manner in which users can engage with or provide inputs on other users' gameplay. For example, commentary on a virtual game is typically performed by recording the gameplay as a media file, overlaying the speech of commentary on the recorded video and then sharing it. This is because the load on storage and network infrastructure imposed by live streaming of video gameplay sessions can be quite large, potentially causing delays and dissatisfaction for end users and maintenance problems for system administrators. Thus, having the users participate in a game as spectators or contribute to the game content in real time is very difficult. Thus, there is a need for systems and methods that maximize player engagement and retention and also improve the experience of playing and performing in video games for players.

There is also a need for systems and methods that encourage more participation and response from users who attend organized, live, multiplayer competitive video gaming events, also known as electronic sports or e-sports events, which are increasing in popularity. A large part of the audience still tends to prefer to watch matches in such competitions via internet streaming or television broadcast. The percentage of viewers who form a live audience can be low. As such, there is also a need for systems and methods that encourage live participation from viewers and that also keep online or remote spectators engaged. Such a system would not only allow the users to participate as spectators in video games, but also enable them to contribute towards the events or contents of the gameplay in real time. It is also desirable that such a video game system does not overload the storage and network infrastructure.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method for incorporating non-player inputs into a gameplay session, wherein the gameplay session is at least partially generated by a computer system and at least partially transmitted to a plurality of end user devices and wherein the computer system includes one or more processors executing a video game streaming application for generating and streaming the gameplay session, the method comprising: determining if a threshold number of non-players exists to trigger a generation of a plurality of game event options for potential inclusion in the gameplay session; based on said determination, generating the plurality of game event options; transmitting data indicative of a user interface to at least some of the end user devices, wherein, when executed by at least some of the end user devices, the user interface presents the generated plurality of game event options and receives non-player inputs indicative of a desire to include at least one of the plurality of game event options into the gameplay session; determining a function of the non-player inputs; selecting at least one of the plurality of game event options based on the function of the non-player inputs; and incorporating the selected at least one of the plurality of game event options into a data stream representative of the gameplay session.

Optionally, the threshold number of non-players is monitored in real time.

Optionally, the threshold number of non-players is at least 1.

Optionally, the non-players include individuals watching the gameplay session remotely on at least some of the end user devices or individuals watching the gameplay session live at a competitive video gaming event.

Optionally, the plurality of game event options include an occurrence of one or more earthquakes, meteor showers, storms, rain, wind, fires, lightning, or other natural disasters.

Optionally, the plurality of game event options include an occurrence of available items for purchase during the gameplay session.

Optionally, the plurality of game event options include a timing and content of supplies and rewards available to specific players in the gameplay session.

Optionally, the plurality of game event options include a placement or existence of armor, weapons, treasure, or other resources available to specific players in the gameplay session.

Optionally, the plurality of game event options include placement or existence of hazards, threats, or challenges presented to specific players in the gameplay session.

Optionally, the plurality of game event options include changes in a layout of a game map.

Optionally, the plurality of game event options are randomly generated.

Optionally, the plurality of game event options are generated to benefit a specific player or team based on a number of non-players supporting, or opposing, the specific player or team.

Optionally, the method further comprises iteratively generating a new plurality of game event options depending on events occurring within the gameplay session and the selected at least one of the plurality of game event options previously incorporated into the data stream representative of the gameplay session.

Optionally, iteratively generating the new plurality of game event options includes generating game event options that were not historically presented to the non-players.

The present specification also discloses a system for incorporating non-player inputs into a gameplay session, wherein system comprises a computer system for at least partially generating the gameplay session and transmitting it to a plurality of end user devices and wherein the computer system includes one or more processors executing a video game streaming application for generating and streaming the gameplay session and executing a non-player input application, wherein, when executed, the non-player input application: determines if a threshold number of non-players exists to trigger a generation of a plurality of game event options for potential inclusion in the gameplay session; based on said determination, generates the plurality of game event options; transmits data indicative of a user interface to at least some of the end user devices, wherein, when executed by at least some of the end user devices, the user interface presents the generated plurality of game event options and receives non-player inputs indicative of a desire to include at least one of the plurality of game event options into the gameplay session; determines a function of the non-player inputs; selects at least one of the plurality of game event options based on the function of the non-player inputs; and causes the selected at least one of the plurality of game event options to be incorporated into a data stream representative of the gameplay session.

Optionally, the threshold number of non-players is at least 1.

Optionally, the plurality of game event options include an occurrence of one or more earthquakes, meteor showers, storms, rain, wind, fires, lightning, or other natural disasters.

Optionally, the plurality of game event options include an occurrence of available items for purchase during the gameplay session, Optionally, the plurality of game event options include a timing and content of supplies and rewards available to specific players in the gameplay session.

Optionally, the plurality of game event options include a placement or existence of armor, weapons, treasure, or other resources available to specific players in the gameplay session.

Optionally, the plurality of game event options include placement or existence of hazards, threats, or challenges presented to specific players in the gameplay session.

Optionally, the plurality of game event options include changes in a layout of a game map.

Optionally, the non-player input application is configured to randomly generate the plurality of game event options.

Optionally, the non-player input application is configured to generate the plurality of game event options to benefit a specific player or team based on a number of non-players supporting, or opposing, the specific player or team.

Optionally, when executed, the non-player input application is configured to iteratively generate a new plurality of game event options depending on events occurring within the gameplay session and the selected at least one of the plurality of game event options previously incorporated into the data stream representative of the gameplay session.

Optionally, the iterative generation of the new plurality of game event options includes generating game event options that were not historically presented to the non-players.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1:
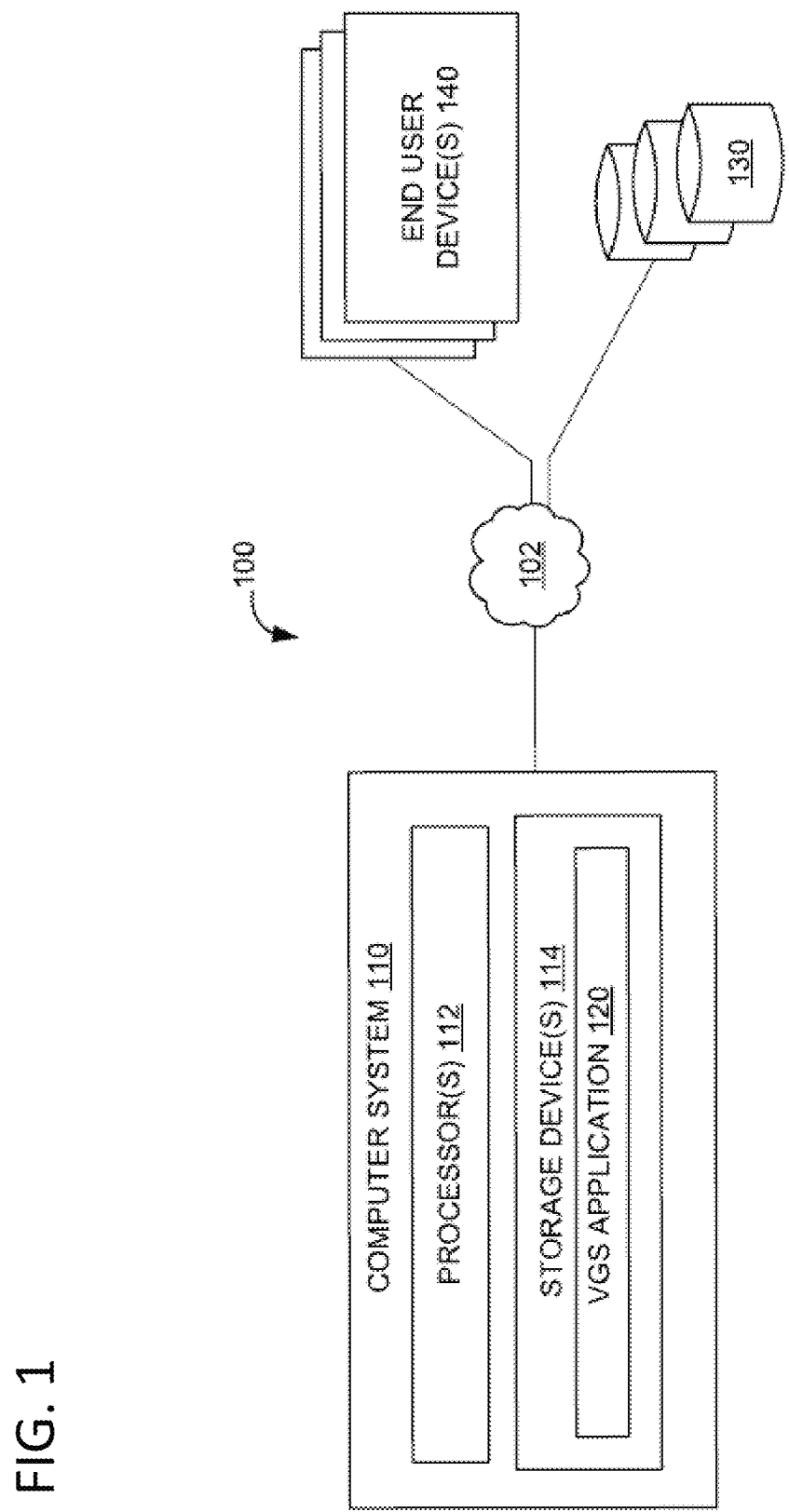
FIG. 1 illustrates an exemplary system of generating and distributing video game streams, according to an embodiment of the specification.

The present specification describes systems and methods that enable non-players to participate as spectators in online video games and, through a collective voting mechanism, determine the occurrence of certain events or contents of the gameplay in real time. In one embodiment, the present systems and methods generate gaming events that are inserted into a video game stream, thereby directly effecting the events, actions, course, objects, resources, or other elements of a real-time gameplay session. Operationally, a plurality of game event options are generated by the present system and presented to a plurality of non-players. A specific one or more of the plurality of game event options is then selected based on a collective vote of the plurality of non-players. Once selected, the specific one or more of the plurality of game event options are then generated as actual gaming events and incorporated into a Video Game Stream ("VGS") that is transmitted to the plurality of players as part of the gameplay session. In this manner, non-players may be able to directly affect the course of gameplay. In another embodiment, the present specification provides methods and systems to encourage more participation and response from non-players who attend live competitive video gaming events.

The term "non-player" refers to any individual who is not actively playing in a gaming session and may include individuals who were formerly players or spectators who were never players in the gaming session, such as non-players who are attending a live gaming event in person or viewing the live gaming event remotely. The term "game event options" refers to programmatically generated events, actions, objects, or resources of a real-time gameplay session and may include any element that is experienced by a player of a gameplay session, such as, but not limited to, the type of weapon that will appear next in a gameplay session, the occurrence of natural disasters or other "acts of God" (e.g., earthquakes, meteor showers, storms, rain, wind, fires, lightning, or other natural disasters), the occurrence of available items for purchase during a gameplay session, the timing and content of supplies and rewards, the placement or existence of armor, weapons, treasure, or other resources, the placement or existence of hazards, threats, or challenges, the placement or existence of random destructive events, whether any of the above are applied to, or made available to, specific players and changes in the layout of the game map. The term "elected game event" refers to those game event options that have been elected by a collective vote, decision, or selection by the non-players. The term "Video Game Stream" refers to a programmatically generated data stream that, when executed by a client device or end user device, generates a gameplay session.

While aspects of the invention may be described herein with reference to particular types of video game genres, the system and method described in detail herein may be used in any genre of a multiplayer video game, including where audience members choose to watch the multiplayer video game in person or via an online platform or where former players become spectators once they are out of the game and waiting for a current match to finish.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise. The disclosed inventions are directed to an improvement in computer-related technology, namely enabling non-players to affect the progress and occurrence of events in video gameplay sessions, thereby increasing non-player interest and viewing of a video gameplay session. In particular, Applicant's specification discloses specific teachings regarding how the claimed inventions enable integrating non-player involvement in a video gameplay session. Accordingly, Applicant's claimed inventions do not preempt all approaches to managing the relations between parties and, instead, are directed to an improvement in video gaming technology grounded firmly in a specific way of achieving the desired outcome of having non-players effect, in real-time, the progress and occurrence of events in video gameplay sessions.

To the extent the claimed inventions are still considered to be "abstract" in nature, it should be appreciated that each of the claim limitations, when viewed as an ordered combination, amount to significantly more than just an abstract idea or concept. The methods and systems of the present invention represent technical improvements to a form of computer technology, video games, by providing a specialized computer system configured to host a plurality of concurrently executing video game streaming applications (for example, anywhere from at least 20 video game streaming applications to at least 1,000,000 video game streaming applications or any increment therein), host a plurality of client devices associated with remotely located non-players (for example, anywhere from at least 10 client devices associated with non-players to at least 3,000,000 client devices associated with non-players or any increment therein), and perform a series of programmatic steps designed to generate electronic user interfaces that present a plurality of game event options, which are specific to the video game applications, receive inputs from the non-players indicative of a desire to include at least one of the plurality of game event options into the gameplay session, and incorporate the selected game event options into a data stream representative of the gameplay session.

Exemplary System Architecture

FIG. 1 illustrates an exemplary system 100 of generating and distributing video game streams, according to an implementation of the present specification. In one implementation, system 100 may include a computer system 110, one or more databases 130, one or more end user devices 140 in communication with the computer system 110 over a network 102, and/or other components.

Computer System 110

In one embodiment, computer system 110 may be configured as a server (e.g., having one or more server blades, processors, and other server components as are known to those of skill in the art), a gaming console, a handheld gaming device, a personal computer (e.g., a desktop computer, a laptop computer, and the like), a smartphone, a tablet computing device, and/or other device that is programmed to encode, decode, and/or distribute game streams as described herein.

Computer system 110 may include one or more processors 112 (also interchangeably referred to herein as processors 112, processor(s) 112, or processor 112 for convenience), one or more storage devices 114 (which may store a VGS application 120), and/or other components. Processors 112 may be programmed by one or more computer program instructions. For example, processors 112 may be programmed by video game stream application 120 and/or other instructions. VGS application 120 may include various instructions that program computer system 110. As described herein, VGS application 120 will be described as programming computer system 110 to perform various operations. However, it should be understood that a portion (or all) of VGS application 120 may, alternatively or additionally, program other system components (e.g., end user device 140) to perform at least some of the functions of VGS application 120.

End User Devices 140

In one embodiment, end user device 140 may be configured as a gaming console, a handheld gaming device, a personal computer (e.g., a desktop computer, a laptop computer, and the like), a smartphone, a tablet computing device, and/or other device that can be programmed to present a video game to be played, view a video game replay, encode a game log, generate a metadata track, and/or perform other functions described herein. Although not illustrated in FIG. 1, end user devices 140 may include one or more physical processors programmed by computer program instructions. For example, end user device 140 may be programmed by all or a portion of VGS application 120.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

Databases 130

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

VGS Application 120

Figure 2:
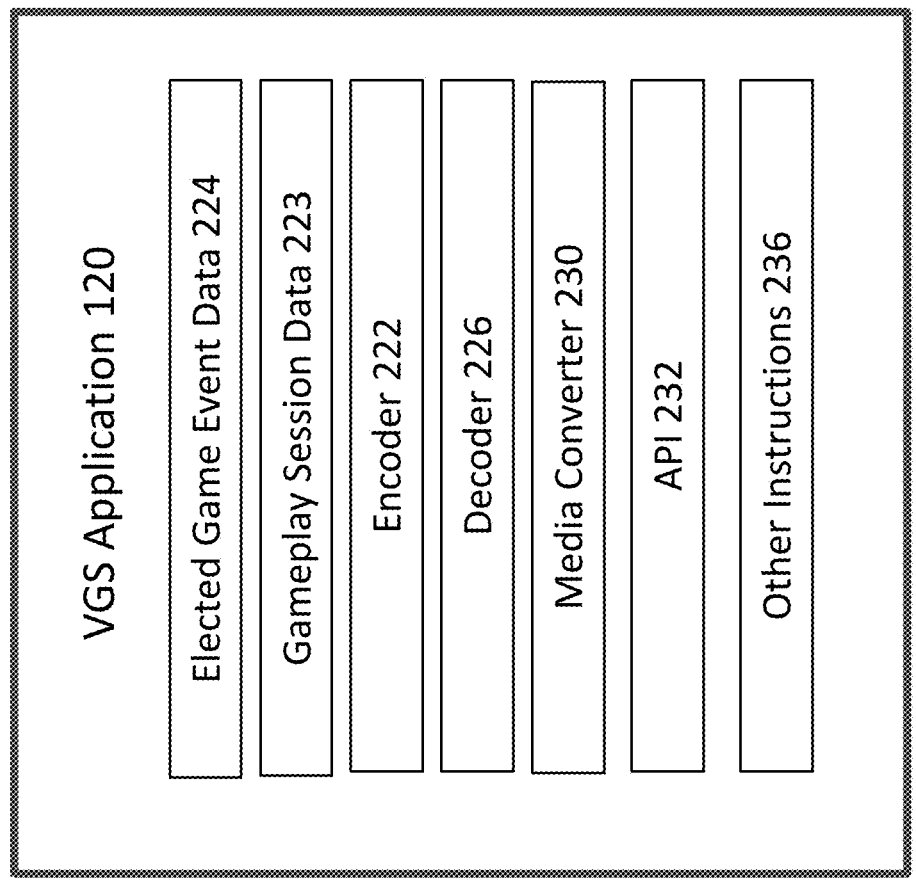
FIG. 2 depicts a block diagram of a video game stream (VGS) application, according to an embodiment of the specification.

FIG. 2 depicts a block diagram of VGS application (shown as 120 in FIG. 1), according to an implementation of the present specification. The instructions of VGS application 120 may include, without limitation, a VGS encoder 222, elected game event data 224, gameplay session data 223, a VGS decoder 226, a media converter 230, an Application Programming Interface ("API") 232, and/or other instructions 236 that program computer system 110 to perform various operations, each of which are described in greater detail herein. As used herein, for convenience, the various instructions will be described as performing an operation, when, in fact, the various instructions program the processors 112 and therefore computer system 110, both shown in FIG. 1, to perform the operation.

In an implementation, VGS encoder 222 may obtain elected game event data 224, as further described below, and integrate the elected game event data with gameplay session data 223 that is conventionally generated by the computer system 110. VGS encoder 222 may assign an identifier to the obtained elected game event data and store the elected game event data and its corresponding identifier (as well as any video game information) in a VGS database, such as a database 130. Elected game event data 224 may be persistently stored in the VGS database 130 for later search and retrieval. In this manner, elected game event data of interest may be searched for or otherwise obtained.

In an implementation, optional VGS decoder 226 may obtain a VGS and decode the VGS to provide the gameplay session with integrated elected game event data. VGS decoder 226 may include (or be part of) the game engine, in which case VGS decoder 226 may be specific for a particular game or set of games for which the game engine provides gameplay. In other instances, VGS decoder 226 may be generic to different types of game engines (and therefore different types of games), in which case VGS decoder 226 may identify an appropriate game engine to use to read the elected game event data and gameplay session data to provide the gameplay session. VGS decoder 226 may use the identifying information to identify an appropriate game engine to use.

Media converter 230 may generate the visual and auditory display of the gameplay session (e.g., using VGS decoder 226) and then convert the playback to a conventional gaming media format. Such conversion may occur via server-based processing (e.g., on computer system 110), distributed processing using end user devices 140, cloud services processing (e.g., via cloud computer systems), and/or through other computer processing techniques.

In an implementation, API 232 may provide access to the elected game event data 223 to facilitate sharing of elected game events 223. For instance, a user may, through end user device 140, request to share an elected game event from a gameplay session being played or already played. API 232 may share the elected game event data 223, in any format described herein, to social sharing networks (e.g., YouTube™, Facebook™, Instagram™ or any other social media network platform). Although described herein as relating to a video game session for convenience, the elected game event data 223 may relate to a continuous type of game (e.g., a virtual world simulation) that has no discrete ending. In these instances, the elected game event data 223 may refer to a segment of time during a portion of the continuous game, as well as specific events in the course of the game.

Figure 3:
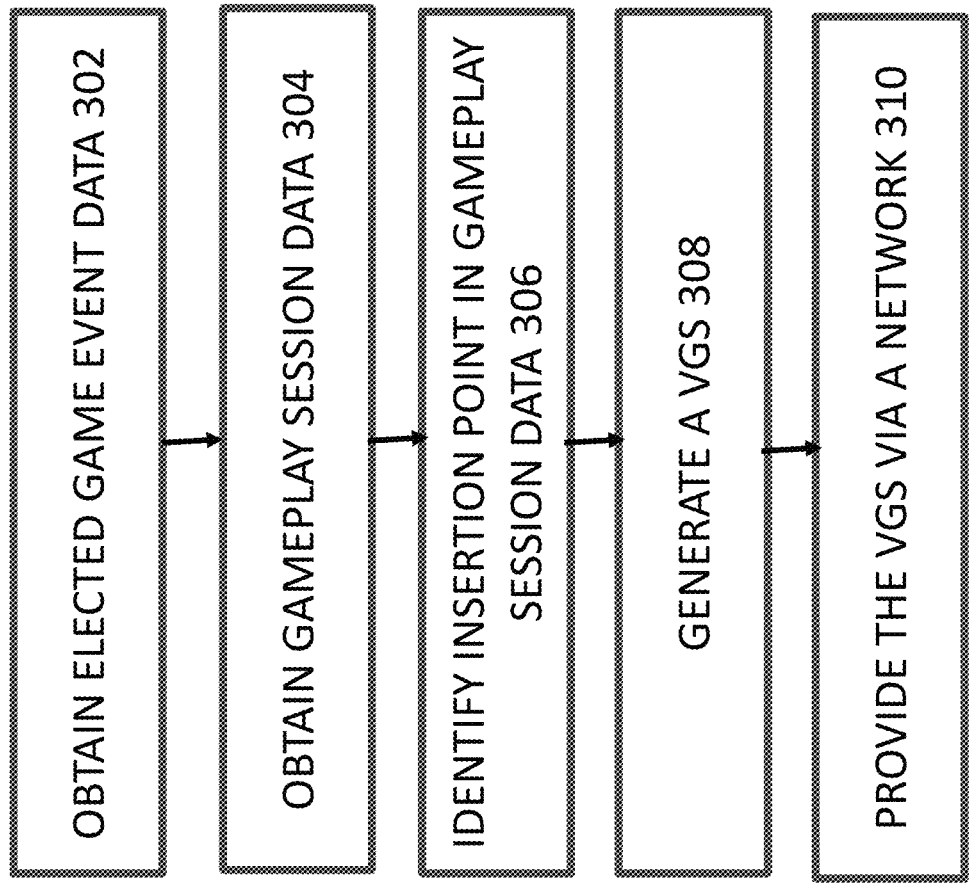
FIG. 3 is a flowchart depicting a process of generating a video game stream, according to an embodiment of the specification.

FIG. 3 depicts a process 300 of generating a video game stream, according to an implementation of the present specification. The various processing steps and/or data flows depicted in FIG. 3 (and in the other drawing figures) are described in greater detail herein. The described steps may be accomplished using some or all of the system components described in detail above and, in some implementations, various steps may be performed in different sequences and various steps may be omitted. Additional steps may be performed along with some or all of the steps shown in the depicted flow diagrams. One or more steps may be performed simultaneously. Accordingly, the steps as illustrated (and described in greater detail below) are exemplary by nature and, as such, should not be viewed as limiting.

Referring to FIG. 3, in the first step 302, process 300 includes obtaining elected game event data, the generation of which is described below. The elected game event data may be obtained from a game engine substantially in real-time as gameplay is occurring or the elected game event data may be pre-stored and introduced at some later point in time as gameplay is occurring. Process 300 may be performed by a game engine or a system component separate from the game engine, in which case the system component may obtain the elected game event data directly or indirectly from the game engine. The elected game event data may include or be associated with identifying information.

In the next step 304, gameplay session data is obtained from the game engine and, in step 306, an insertion point is identified in the gameplay session data, at which point the elected game event data is overlaid, inserted, or otherwise integrated with the conventionally generated gameplay session data. It should be appreciated that, alternatively, a game engine may generate gameplay session data with the elected game event data 302 already incorporated, integrated, or combined therein, thereby eliminating a separate integration step. Accordingly, the VGS, or portions thereof, is configured to obtain elected game event data 302, as identified by an identifier, and overlay, insert, or otherwise integrate it with a secondary data stream (conventional gameplay session data) to generate a final video game stream that is communicated to client devices.

The next step 308 comprises generating a VGS of the complete gameplay session with both the gameplay session data and the elected game event data incorporated therein. Subsequently, at step 310, the VGS is transmitted to end user devices via a network. The end user device may then process the VGS to generate the gameplay session in real-time.

Generating Elected Game Event Data Based on Non-Player Input

As discussed above, in several multiplayer games, non-players may participate in, and contribute towards, a gameplay session by voting on the occurrence of gameplay events, thereby generating elected game event data. For example, in an action or combat game where random weapons are generated from time to time, non-players may vote for the type of weapon that will appear next. Other examples of elements spectators could vote on include, but are not limited to, the occurrence of natural disasters or other "acts of God" (e.g., earthquakes, meteor showers, storms, rain, wind, fires, lightning, or other natural disasters), the occurrence of available items for purchase during a gameplay session, the timing and content of supplies and rewards, the placement or existence of armor, weapons, treasure, or other resources, the placement or existence of hazards, threats, or challenges, the placement or existence of random destructive events, whether any of the above are applied to, or made available to, specific players and changes in the layout of the game map—for example, in a large map, certain areas may be removed or closed to access such as by removing a bridge, locking a door, or placing an obstacle, such as fallen trees or a building, to block a path, among other options.

Figure 4:
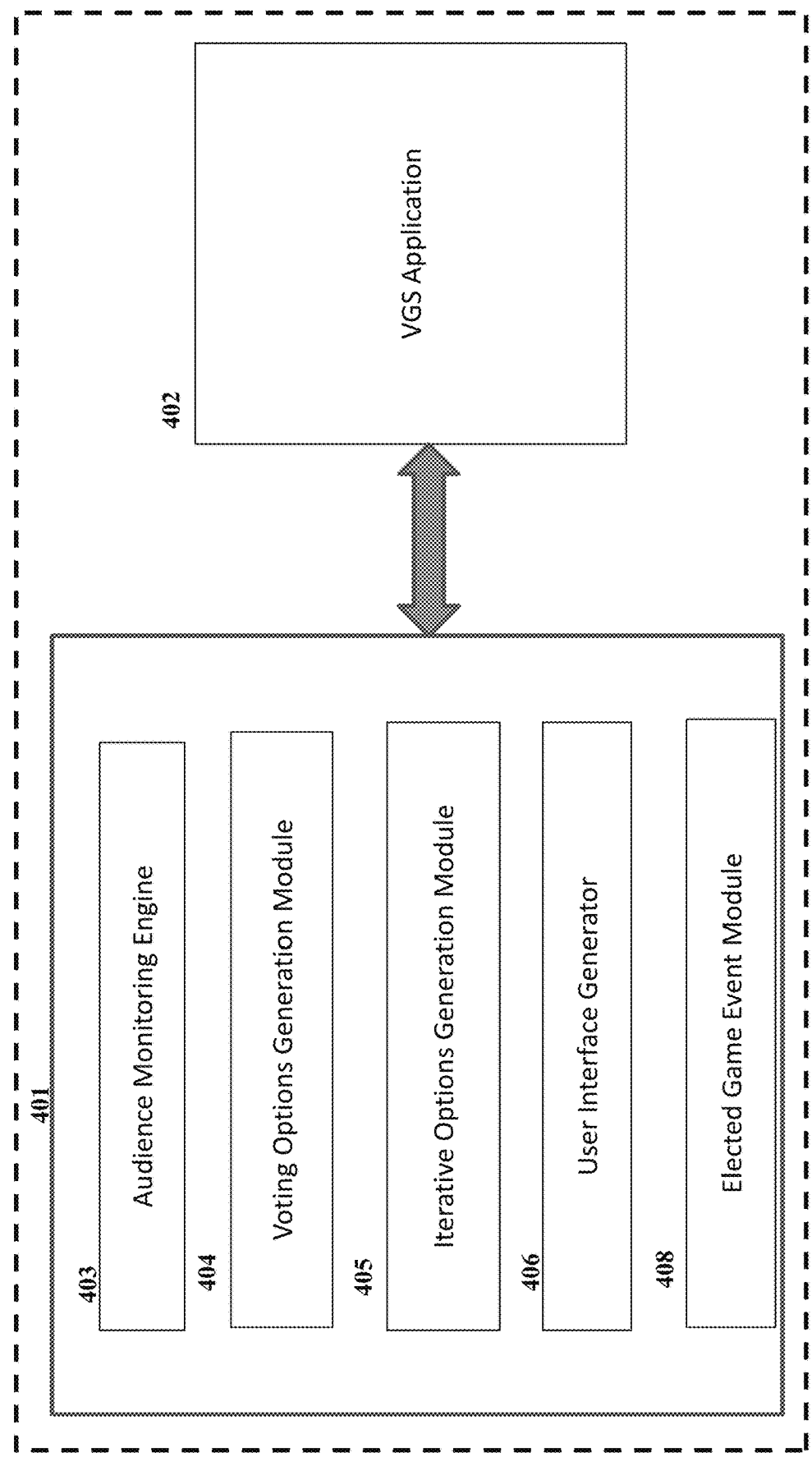
FIG. 4 is a block diagram of illustrating the components of a non-player participation system, according to an implementation of the present specification.

FIG. 4 is a block diagram illustrating the components of a non-player participation system 400, according to an implementation of the present specification. Referring to FIG. 4, in one embodiment, the system 400 comprises a Non-Player Input application 401, which is in communication with a VGS application 402 (shown as 120 in FIG. 1 and FIG. 2), such that the content selected by non-players, namely the elected game event data, may be incorporated into a video game stream (VGS). The instructions of Non-Player Input application 401 may include, without limitation, an audience monitoring engine 403, a voting options generation module 404, an iterative options generation module 405 and a user interface generation module 406, and/or other instructions that program computer system (110 of FIG. 1) to perform various operations, each of which are described in greater detail herein. As used herein, for convenience, the various instructions will be described as performing an operation, when, in fact, the various instructions program the processors 112 and therefore computer system 110, both shown in FIG. 1, to perform the operation.

Audience Monitoring Engine

Referring to FIG. 4, the Non-Player Input application 401 comprises an audience monitoring engine 403. The audience monitoring engine 403 is configured to monitor a number of on-line access streams, each of the on-line access streams being representative of a client device that is watching a gameplay session. In one embodiment, options to elect one or more game events during a gameplay session are triggered only when the number of non-players meets or exceeds a threshold number. In one embodiment, the number of non-players, represented by one or more data streams associated with unique or distinct MAC addresses, is monitored in real time, thereby allowing the system to determine if a threshold number of players is available. In an embodiment, the threshold number is at least one non-player.

In some embodiments, a threshold number of non-player votes may be different for different types or categories of game event options. In an embodiment, the game event options may be categorized based on the severity of their effect on the gameplay. For example, a game event option of selecting a weapon may require at least X % of votes from the non-players whereas a game event option of generating a natural disaster may require at least Y % of votes, wherein Y % is greater than X % since the natural disaster has a more severe impact on the gameplay compared to the weapon being incorporated into the gameplay. In some embodiments, the severity of the effect of an elected game event option, on a gameplay, may increase with increasing number of percentage of votes. For example, at least 75% votes may be needed to incorporate an earthquake in the gameplay, but the severity of the earthquake may scale up with the voting percentage such that a 99% vote may trigger a major earthquake in the gameplay. Stated differently, game event options have differing levels of severity and an engine, as further described below, may require game event options of higher levels of severity to have a higher threshold number of non-player votes as compared to game event options of lower levels of severity.

In one embodiment, the feature of selecting events based on non-player input is available to non-players watching a gameplay session remotely on their devices, as well as to a live audience watching a game at a competitive video gaming event or e-sports event.

Figure 5:
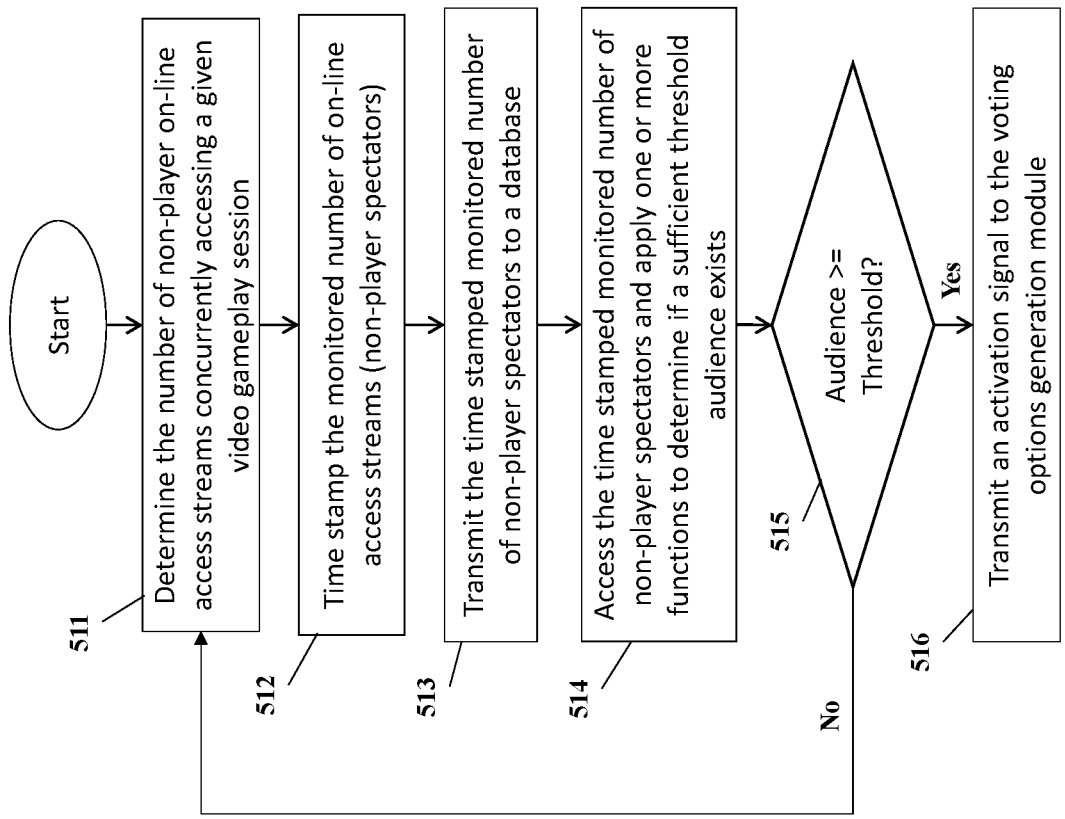
FIG. 5 is a flowchart illustrating the operation of an audience monitoring engine, according to one embodiment of the present specification.

FIG. 5 is a flowchart illustrating the operation of the audience monitoring engine. Referring to FIG. 5, in conjunction with FIG. 4, in the first step 511 the audience monitoring engine 403 determines on an on-going and real-time basis, using a first plurality of programmatic instructions, the number of non-player on-line access streams that are concurrently accessing a given gameplay session. The first plurality of programmatic instructions may also be configured to receive data indicative of the number of non-players watching the gameplay session in person, as opposed to via on-line access streams.

In the next step 512, using a second plurality of programmatic instructions, the audience monitoring engine 402 time stamps the monitored number of on-line access streams and/or number of non-players watching the gameplay session in person (collectively, the monitored non-players). Next, in step 513, the system transmits the time stamped monitored number of non-players to a database for storage. Next, in step 514, using a third plurality of programmatic instructions, the audience monitoring engine 403 accesses the time stamped monitored number of non-players and applies one or more functions to determine if and when a sufficient number of non-players exists in order to trigger the non-player participation system 400, as described below. In one embodiment, the one or more functions may include averaging the time stamped monitored number of non-players over a predefined period of time and, if the averaged time stamped monitored number of non-players is above a predefined number or threshold number, as shown in steps 515 and 516, the audience monitoring engine 403 transmits an activation signal to the voting options generation module 404, described below. If the averaged time stamped monitored number of non-player is not above a predefined number, the audience monitoring engine 403 does not transmit an activation signal to the voting options generation module and, instead, continues monitoring the number of non-players. Accordingly, non-player inputs selectable by means of votes are available only when there are sufficient or threshold numbers of non-players watching the gameplay session. In an embodiment, the threshold number is at least one non-player.

Voting Options Generation Module

Referring back to FIG. 4, once the audience monitoring engine 403 recognizes that a sufficient or threshold number of non-players are available as described above, the voting options generation module 404 in the Non-Player Input application 401 determines a plurality of game event options related to future events of gameplay that are to be presented to the non-players for voting. In some embodiments, the game event options are related to dynamic events, depending upon a state and/or course of gameplay, in addition to future events of gameplay. Accordingly, different instances of the same point in the same level of a game may lead to different game event options based upon the historical success of one or more players, the experience level of one or more players, the average experience level of all players, the health level of one or more players, the average health level of all players, the weapons possessed by one or more players, the number of kills of one or more players, the average number of kills of all players, or any other metric taken individually, collectively, or some other function thereof.

In one embodiment, non-players may vote to assist or hinder one, some, or all the players playing in an ongoing gameplay session. Their vote may be used to change the status of or affect the health, damage, speed, armor, weapons, skills, items, spells, and other items or attributes available to one or more players. It may be noted however, that such events that can be decided by the non-players' votes are generated by the voting options generation module 404 such that these events have the potential to affect all players equally and keep the gameplay session fair. That is, the generation of these game event options is preferably designed such that a true randomized, non-biased and neutral gaming environment is achieved. The occurrence of events and the gaming environment is designed with boundaries such that extremes of disincentives and excess incentives are avoided.

In one embodiment, the voting options generation module 404 uses a plurality of instructions to execute multiple methods by which game event options will be drawn, preferably randomly, during a gameplay session. In one embodiment, pseudo random number generators (PRNGs) are executed to draw game event options. Non-limiting examples of PRNGs comprise Linear Congruential Generator, Middle Square Weyl Sequence PRNG, and Mersenne Twister based PRNG. According to one aspect of the present system for example, the voting options generation module 404 may use a plurality of instructions to draw events from multiple groups, with each group having a fixed probability of being selected. According to another aspect, the voting options generation module 404 may use a plurality of instructions to select an event group via a "counter value" method, wherein the maximum number of draws allowed is set before a given group of events is chosen. The probability of generating an event from the group in a smaller number of draws than the maximum is set to be independent of the draw number. In an embodiment of the counter value method for example, the voting options generation module 404 uses a mathematical formula to ensure that each event has an equal chance of being selected to be put up for voting. In another embodiment, the voting options generation module 404 initializes the draw numbers for events such that unusually poor events are not successively generated in a game. Thus, the voting options generation module 404 ensures that the timing and delivery of an event for selection by vote is done in a manner that takes fairness and randomness into account.

In one embodiment, randomness and fairness in the game is ensured by the type of events that are generated by the voting options generation module 404 and presented as options to the non-players for voting. For example, events such as natural disasters or "acts of God" have the potential to affect the playing field equally, and therefore affect all players. Other examples of events that affect competing players equally include allowing a particular weapon to be available for a certain amount of time at a particular location, so that all players have an equal chance of trying to obtain it; providing a health and energy boost to each team's weakest member, or closing a common area on the game map, so that both the teams have to adopt a different route and/or strategy. In one embodiment, competing players are provided with notice of a forthcoming elected game event after the non-players' votes have been tallied, to allow them time to prepare for the elected game event. For example, if the non-players vote for a natural disaster, such as an earthquake, the players may receive a notification that an earthquake will strike within 2 minutes or some other time frame.

One of ordinary skill in the art would appreciate that although the plurality of game events options presented for voting are selected in a random but equitable manner, the vote of the non-players may be configured to specifically help or hurt one set of players. For example, non-players players may give the losing team members a boost by choosing to provide them a weapon whose owner is decided by voting, or the non-players may vote to disable one of the winning team's special powers or other attributes. Thus, the non-players may be allowed to affect gameplay by affecting the game balance or by introducing random, unpredictable scenarios.

In some embodiments, the voting options generation module 404 segments non-players into, at least, a first group that is provided access to a first set of game event options and into a second group that is provided access to a second set of game event options, where the first set of game event options is greater than the second set of game event options and where the segmentation is based upon attributes, achievements, profile elements, or other characteristics of the non-players themselves. In an embodiment, the voting options generation module 404 determines if a non-player meets a threshold number of conditions out of a plurality of predefined conditions such as, but not limited to, the number of hours of a game played, whether the non-player is a live audience member or viewing the game remotely, the non-player's experience gained in a particular game, the non-player's level achieved in a game, the non-player's ranking in a game, the number of times the non-player attended a live event, the number of times the non-player attended a specific e-sports arena, and the number of times the non-player attended an event featuring a particular team.

If the threshold number of conditions are met then the voting options generation module 404 presents a higher number of game event options to the non-player, as a reward, in comparison to other non-players who do not meet the threshold number of conditions. Alternatively or additionally, if a certain type of condition is met by a non-player, the voting options generation module 404 presents a specific game event option and/or a higher number of game event options to that non-player in comparison to other non-players who do not meet satisfy the certain type of condition. For example, if a non-player A attends an e-sports event as a live audience member (certain type of condition), then the non-player A is presented with more number of game event options to vote for as compared to another non-player B who may be viewing the game remotely and not physically present at the e-sports event.

In some implementations, the plurality of game event options are presented to the non-players for voting only after the non-players overcome at least one challenge. In embodiments, the voting options generation module 404 implements a plurality of instructions to generate and present at least one challenge to the non-players which needs to be accomplished before the plurality of game event options are presented to the non-players for voting. In some embodiments, the at least one challenge may be in the form of an interactive mini-game (for example, a short duration game) wherein the outcome of the non-players playing the mini-game impacts which non-player will be presented with game event options for voting and/or other rewards. As illustrative non-limiting examples, a) non-players who complete the mini game or achieve a certain score or objective unlock an ability to vote on presented game event options, b) which ever fan group receives the highest score in the mini-game, has the largest number of fans completing an objective in the mini-game or a combination of the two unlocks a benefit for their team, c) non-players who complete an objective in the mini-game are entered into a random draw (apart from unlocking the ability to vote on the presented game event options) and at least one winner gets to directly interact into the live game, and d) non-players who complete an objective in the mini-game are entered into a random drawing (apart from unlocking the ability to vote on the presented game event options) and at least one winner who achieves a score above a threshold score, for example, gets a chance to play in a get-together, such as a party, with their favorite streamer or player.

Iterative Options Generation Module

The Non-Player Input application 401 further comprises an iterative game event options generation module 405 which uses a plurality of instructions to iteratively generate new options for game events that can be selected by non-player vote. In one embodiment, the new options generated by the iterative options generation module 405 depend on at least one of a plurality of factors such as, but not limited to, the course of the game, namely how the gameplay progresses, the historical options presented to and/or selected by the non-players, number of players or teams that have been eliminated, how far the game has progressed, time left in game, player proximity to each other (e.g., too many players in a boring zone). In one embodiment, the new options are generated by the iterative options generation module 405 in real-time, as the game is played. For example, if one or more of previous events selected by vote have caused one of the playing teams to considerably enhance their strength, the iterative options generation module 405 may execute a plurality of instructions to generate new options which provide the users a chance to vote for an event that enhances the strength of the lagging team. As another example, if an event causes "heavy rain" in the game, subsequent options generated by the iterative options generation module 405 may allow the users to select "flooding" of one or more areas on the game map, thereby making it inaccessible to all players of the game. Thus, the iterative options generation module 405 provides voting options in line with prior events and the course of the game. In one embodiment, the iterative options generation module 405 determines a plurality of additional game event options based on inferred non-player interest. Thus, for example, if a majority of non-players appear to prefer a particular maneuver in a combat based game, as inferred from non-player votes and other data, the iterative options generation module 405 may generate similar maneuvers as one of the plurality of game event options to the non-players in future.

User Interface Generator

After determining the options for gameplay events on which non-players can vote, the user interface generator module 406 in the Non-Player Input application 401 uses a plurality of instructions to generate a user interface in the client device of non-players that presents the plurality of game event options to the non-players and allows them to select one of the plurality of game event options at various points in time during the gameplay using their devices.

In an embodiment, the Non-Player Input application 401 communicates with the VGS application 402 to generate a user interface with voting options on the client devices, in accordance with the instructions executed by the user interface generator module 406. In an embodiment, the user interface is generated at the end user device(s) by the VGS decoder (referred as 226 in FIG. 2). The user interface thus generated by the VGS decoder may be overlaid on the gameplay session, for the non-players, and may include hotspots or other interactive elements configured to receive user inputs. Operationally, the VGS decoder 226 causes a user interface with selectable inputs to be provided at the client device, in accordance with the plurality of instructions executed by the voting options generation module 404 and the user interface generator module 406, that allow a user to specify which of the plurality of game event options should be integrated into the gameplay session. In a voting system, the choices of all the non-players are communicated through the user interface to the game engine, and the votes are tallied to determine which of the plurality of game event options will constitute an elected game event and, therefore, be used in the gameplay session.

The elected game event module 408 is configured to receive, from non-players client devices, data indicative of which of the plurality of game event options has been selected by the non-players. The elected game event module 408 is preferably in communication with one or more databases to store the number, timing, and association of each vote with specific non-players relative to each of the plurality of game event options. The elected game event module 408 further determines which of the plurality of game event options receives enough votes to warrant being incorporated into a gameplay session and, therefore, constitute an elected game event. The determination of which of the plurality of game event options receives enough votes to warrant being incorporated into a gameplay session is achieved by comparing the number of votes to one or more threshold values.

It should be appreciated that a non-player may be exercising multiples votes at the same time, either in a particular match or across multiple matches in an arena. For example if there are two matches happening simultaneously in the arena, a non-player or spectator may be able to vote on both of those matches. In some embodiments, voting is limited depending upon the proximity of the spectator. For example, if a non-player is seated in an area designated as spectating for a particular match, then he can only vote on that match. In some embodiments, certain events can only be voted on by those non-players who are live audience members, or by those in certain designated seats or physical proximity. In some embodiments, certain events can only be voted by those non-players who are watching virtually or remotely while certain events can be voted on by any spectator live or remote. The restriction regarding who may vote may be effectuated by the voting options generation module or by a filter in the user interface generator.

Using the VGS Application for Incorporating Selected Events into the Video Game Stream In an embodiment, the Non-Player Input application 401 communicates with the VGS application 402 to generate a user interface with voting options on non-player client devices. Referring to FIG. 4 in conjunction with FIG. 2, while the VGS decoder (referred as 226 in FIG. 2) in the VGS application causes a user interface with selectable inputs to be provided at the client device, the VGS encoder (referred as 222 in FIG. 2) is configured to accept user-provided content from the end user device(s). In one embodiment, VGS encoder 222 may include an input interface configured to receive voting inputs from non-player end user devices. In one embodiment, the VGS application 402 includes a communication module, which is configured to obtain voting inputs and/or action requests from the non-players, via the user interface, and transmit it to the VGS encoder for implementation.

Figure 6:
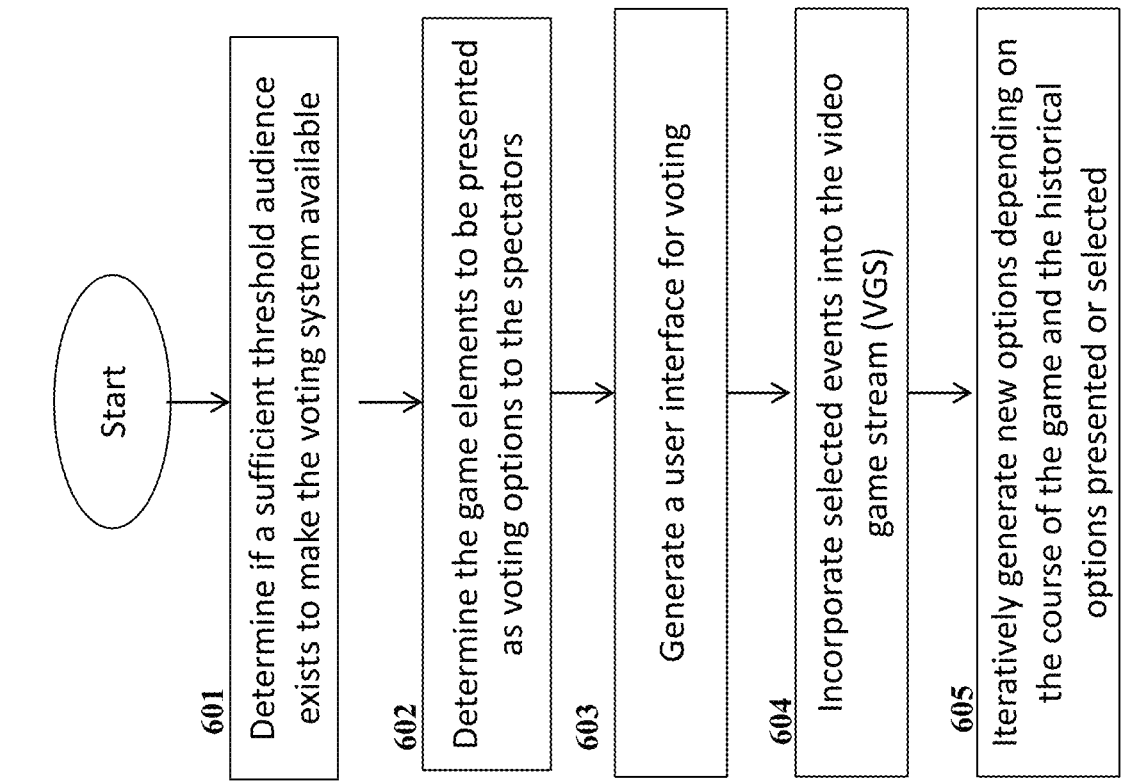
FIG. 6 is a flowchart illustrating an exemplary method of incorporating spectator inputs into gameplay.

FIG. 6 is a flowchart summarizing an exemplary method of incorporating non-player inputs into gameplay, using the non-player participation system of FIG. 4. Referring to FIG. 6 in conjunction with FIG. 4, in the first step 601, the audience monitoring engine 403 of the Non-Player Input application 401 determines if and when a sufficient threshold audience exists in order to make the voting system available. That is, non-player inputs selectable by means of votes are available only when there are sufficient or threshold numbers of non-player watching the gameplay. For this purpose, in one embodiment, the number of non-player is monitored in real time. In the next step 602, after it is determined that a sufficient audience exists, the voting options generation module 404 of the Non-Player Input application 401 determines the plurality of game event options that are to be presented as voting options to the non-players. In the next step 603, the user interface generator 406 causes a user interface associated with the voting options to be generated on the end-user client devices, by means of the VGS from the VGS application 402. The user interface puts forward various selectable options to the non-players and allows them to select one of the multiple options at various points in time during the gameplay. In the next step 604, the game events corresponding to the options selected by majority vote of the non-players is incorporated into the video game stream (VGS) at the appropriate time, which is enabled by the VGS application, as described above. In one embodiment, the system iteratively generates new options for game events that can be selected by non-player votes depending on the course of the game, as the game is played, and the historical options presented and/or selected, as shown in step 605.

Participation of Live and Remote Audiences During a Competitive Gaming Event

In yet another embodiment, the present specification describes a system and method for encouraging participation of viewers in a live video gaming event and actively engaging both live and remote audiences of such events.

In an implementation, the present system allows for the "crowd advantage" that is commonly seen in live sports events, to be simulated in the user devices of non-players who are viewing a live gameplay session remotely. In an instance, a live crowd response at an e-sports event may be used to create an in-game effect for the users viewing the game remotely. This effect may include cheering and/or clapping from the audience, which is heard on end user devices as well. In one embodiment, to simulate the effect of crowd advantage, virtual effects are introduced that may work to the advantage or disadvantage of a competing player or team. For example, when the decibel level of home crowd in a live e-sport event reaches a certain threshold, as determined by a sound monitor in data communication with the Non-Player Input application 401, an effect may be introduced against the visiting team—such as lowering the headphone volume of the visiting team, or introducing static in their headphones to further disrupt communication. This provides an incentive for the spectators to participate in live e-sports events by making such an event more engaging for them and motivating them to watch the event live to support their team. In one embodiment, crowds in such live e-sports events may be seated in different sections based on their interest in the team they would like to support, with sound monitors customized to process sound data from a particular section as being indicative of support for, or rooting against, a particular team or player. One of ordinary skill in the art would appreciate that the present system does not just allow in game effects for a home crowd, but accounts for audience response seated in the visiting sections as well.

In an implementation, as a variation of the above instance, the present system allows remote viewers to specify using their devices, which team they are supporting. In one embodiment, the team with more fans watching may receive an advantage in the match. For example, the elected game events module 408 may be configured to receive data indicative of which player or team has more supporters. Such data may be in the form of directs votes, cheering sounds, booing sounds, or other communications indicative of either support of, or opposition to, a particular player or team. Once the elected game events module 408 receives such data, it automatically selects one or more game events to be incorporated into the VGS. Such automatically elected game events may include 1) dimming the visual experience of gameplay for a team or player having fewer supporters or having more opposition among the non-players, 2) lowering the headphone or auditory volume of gameplay for a team or player having fewer supporters or having more opposition among the non-players, 3) adding static to the visual or auditory experience for the gameplay of a team or player having fewer supporters or having more opposition among the non-players, or 4) creating momentary "blackouts" of the visual or auditory experience of the gameplay for a team or player having fewer supporters or having more opposition among the non-players.

In an implementation, as another variation of the above instance, the present system accounts for and incentivizes live audiences for various audio levels and characteristics of crowd cheering, chanting or singing that add to the communal experience and entertainment value. For example, when the decibel level of a home crowd in a live e-sport event reaches a certain threshold, as determined by a sound monitor in data communication with the Non-Player Input application 401, certain predetermined in-game digital items may be unlocked for the fans and/or the crowd may get entitled for other forms of reward such as, but not limited to, discount coupons, favorite team based accessories, and autographed items. In various embodiments, the sound monitor in data communication with the Non-Player Input application 401 may additionally be configured to recognize a plurality of characteristics of the crowd audio such as, but not limited to, a degree of unison in which the live audiences may be singing, chanting (similar to European style football or terrace chants), presence of specific words in an order and/or above a threshold decibel level and similarity to one of a plurality of hymns, popular music, folk songs, specific songs, advertising jingles, nursery rhymes and theme tunes. It should be appreciated that rewards may be distributed using a digital distribution system, such as by automatically allocating a reward to the game account of a non-player, or using a physical distribution system.

In some embodiments, the audience monitoring engine 403 (FIG. 4) executes a plurality of instructions to implement a system to weigh votes of the non-players. Votes of a non-payer may be weighed based on at least one of a plurality of criteria or characteristics associated with the non-player such as, but not limited to, the number of hours for which the non-player has played a game, the non-player's experience gained in a particular game, the non-player's level achieved in a game, the non-player's ranking in a game, number of times the non-player attended a live event, number of times the non-player attended a specific e-sports arena, and the number of times the non-player attended an event featuring a particular team. In some embodiments, non-players can accrue or lose points that are then translated as appropriate weights and applied to their votes. For example, non-players can accrue points by performing certain activities such as, but not limited to, attending, watching or spectating matches wherein attending a match as live audiences may accrue more points as compared to attending a match remotely, playing the game or completing a plurality of in-game objectives.

In one embodiment, non-player inputs obtained from the audience watching a match live may be used to select the view of the gameplay being streamed or broadcast. A VGS may comprise multiple camera angles or perspectives of a gameplay session. In one embodiment, non-players may be allowed to select one of several different views of the gameplay session, including an aerial view, a first-person-view of a particular player in a multi-player game, or a side perspective view of the gameplay session. In one embodiment, the collective choice of the audience, as represented by majority non-players votes, may be used as a basis for selecting a particular viewpoint to be displayed on an e-sports broadcast or live stream of the gameplay session. In one embodiment, the non-players who are able to vote include the live audience—who may vote using an app or a user device, as well as remote audience who may vote using the device they are viewing the gameplay session on. In some embodiments, this feature is only available to a live audience, in order to encourage live participation in the gaming events. It may be appreciated that a VGS may comprise a plurality of different tracks, thereby enabling non-players to choose which track to use, effectively enabling non-players to toggle between different views.

In one embodiment, members of the audience may be selected to participate in an ongoing game. For example, in a combat or fight based game, a member of the audience or a fan may be invited for operating a gun turret or a tower in the ongoing game or match. The member may be chosen in a variety of ways, including, but not limited to random selection using a draw of lots, winning a contest held prior to the event or during the e-sports event, paying for the opportunity, making in-game purchases while playing the game online, playing in specific online tournaments, watching advertisements while playing the game online or watching advertisements during the event, among other options. It may be appreciated that this feature of selecting an audience to participate in an ongoing game may be applied to viewers watching the video gaming event live or remotely. In some embodiments, this feature is only available to a live audience, in order to encourage live participation in the gaming events.

In another embodiment, viewers watching an e-sports event live may be rewarded with prizes, rewards or entitlements based on the outcome of the gaming event. For example, user A, who plays a video game and is also a fan of Team X in the game, designates Team X as his favorite team in a live match that he or she watches at an event. If Team X wins, user A is given an in-game reward or entitlement, such as bonus points or levels, tools or weapons that can be used while playing the game, a rare set of in-game supplies or a discount on a game, in-game digital item or a physical item. In embodiments, the discount may or may not have a time limit on them. For example, a coupon or code/token may represent a discount for a limited (or unlimited0 period of time. It may be appreciated that the outcomes which generate rewards for viewers are not limited to just their favorite team winning, but may include any other events or outcomes in the game that may be deemed fit to encourage user engagement. Examples of such outcomes include the favorite player of a viewer getting the 'most favorable player' award, a team picked by the non-player winning the match, or a score exceeding a certain threshold, among other scenarios.

In one embodiment, the appropriate outcome-based reward is given to a non-player on confirming his or her presence as a live audience member, such as by producing a ticket he or she bought or by confirming a geographical location tag (geotagging). Such location may be based on Internet Protocol address information, network connection information (e.g., network devices used to connect the user to the Internet), Global Positioning System data, or other location information based on a location device or receiver.

In one embodiment, a plurality of conditions may be applicable to trigger an outcome-based reward for a non-player. In other words, if an attendee is a) physically present in an e-sports arena b) possesses a physical object and c) a specific match outcome occurs then a reward is triggered for the non-player. For example, a non-player a) attends an e-sports event (as a live audience), b) buys a team souvenir at the event and c) his team wins the match then the non-player gets a reward in the game.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for incorporating non-player inputs into a gameplay session, wherein the gameplay session is at least partially generated by a computer system and at least partially transmitted to a plurality of end user devices and wherein the computer system includes one or more processors executing a video game streaming application for generating and streaming the gameplay session, the method comprising:
   determining if a threshold number of non-players exists to trigger a generation of a plurality of game event options for potential inclusion in the gameplay session;
   based on said determination, generating the plurality of game event options;
   transmitting data indicative of a user interface to at least some of the end user devices, wherein, when executed by at least some of the end user devices, the user interface presents the generated plurality of game event options and receives non-player inputs indicative of a desire to include at least one of the plurality of game event options into the gameplay session;
   determining a function of the non-player inputs;
   selecting at least one of the plurality of game event options based on the function of the non-player inputs;
   incorporating the selected at least one of the plurality of game event options into a data stream representative of the gameplay session; and
   iteratively generating a new plurality of game event options depending on events occurring within the gameplay session and the selected at least one of the plurality of game event options previously incorporated into the data stream representative of the gameplay session.

2. The method of claim 1, wherein the threshold number of non-players is monitored in real time.

3. The method of claim 1, wherein the threshold number of non-players is at least 1.

4. The method of claim 1, wherein the non-players include individuals watching the gameplay session remotely on at least some of the end user devices.

5. The method of claim 1, wherein the non-players include individuals watching the gameplay session live at a competitive video gaming event.

6. The method of claim 1, wherein the plurality of game event options include an occurrence of one or more earthquakes, meteor showers, storms, rain, wind, fires, lightning, or other natural disasters.

7. The method of claim 1, wherein the plurality of game event options include an occurrence of available items for purchase during the gameplay session.

8. The method of claim 1, wherein the plurality of game event options include a timing and content of supplies and rewards available to specific players in the gameplay session.

9. The method of claim 1, wherein the plurality of game event options include a placement or existence of armor, weapons, treasure, or other resources available to specific players in the gameplay session.

10. The method of claim 1, wherein the plurality of game event options include placement or existence of hazards, threats, or challenges presented to specific players in the gameplay session.

11. The method of claim 1, wherein the plurality of game event options include changes in a layout of a game map.

12. The method of claim 1, wherein the plurality of game event options are randomly generated.

13. The method of claim 1, wherein the plurality of game event options are generated to benefit a specific player or team based on a number of non-players supporting, or opposing, the specific player or team.

14. The method of claim 1, wherein iteratively generating the new plurality of game event options includes generating game event options that were not historically presented to the non-players.

15. A system for incorporating non-player inputs into a gameplay session, wherein system comprises a computer system for at least partially generating the gameplay session and transmitting it to a plurality of end user devices and wherein the computer system includes one or more processors executing a video game streaming application for generating and streaming the gameplay session and executing a non-player input application, wherein, when executed, the non-player input application:
  determines if a threshold number of non-players exists to trigger a generation of a plurality of game event options for potential inclusion in the gameplay session;
  based on said determination, generates the plurality of game event options;
  transmits data indicative of a user interface to at least some of the end user devices, wherein, when executed by at least some of the end user devices, the user interface presents the generated plurality of game event options and receives non-player inputs indicative of a desire to include at least one of the plurality of game event options into the gameplay session;
  determines a function of the non-player inputs;
  selects at least one of the plurality of game event options based on the function of the non-player inputs;
  causes the selected at least one of the plurality of game event options to be incorporated into a data stream representative of the gameplay session; and
  iteratively generates a new plurality of game event options depending on events occurring within the gameplay session and the selected at least one of the plurality of game event options previously incorporated into the data stream representative of the gameplay session.

16. The system of claim 15, wherein the threshold number of non-players is at least 1.

17. The system of claim 15, wherein the plurality of game event options include an occurrence of one or more earthquakes, meteor showers, storms, rain, wind, fires, lightning, or other natural disasters.

18. The system of claim 15, wherein the plurality of game event options include an occurrence of available items for purchase during the gameplay session.

19. The system of claim 15, wherein the plurality of game event options include a timing and content of supplies and rewards available to specific players in the gameplay session.

20. The system of claim 15, wherein the plurality of game event options include a placement or existence of armor, weapons, treasure, or other resources available to specific players in the gameplay session.

21. The system of claim 15, wherein the plurality of game event options include placement or existence of hazards, threats, or challenges presented to specific players in the gameplay session.

22. The system of claim 15, wherein the plurality of game event options include changes in a layout of a game map.

23. The system of claim 15, wherein the non-player input application is configured to randomly generate the plurality of game event options.

24. The system of claim 15, wherein the non-player input application is configured to generate the plurality of game event options to benefit a specific player or team based on a number of non-players supporting, or opposing, the specific player or team.

25. The system of claim 15, wherein the iterative generation of the new plurality of game event options includes generating game event options that were not historically presented to the non-players.

* * * * *